Figure 1:
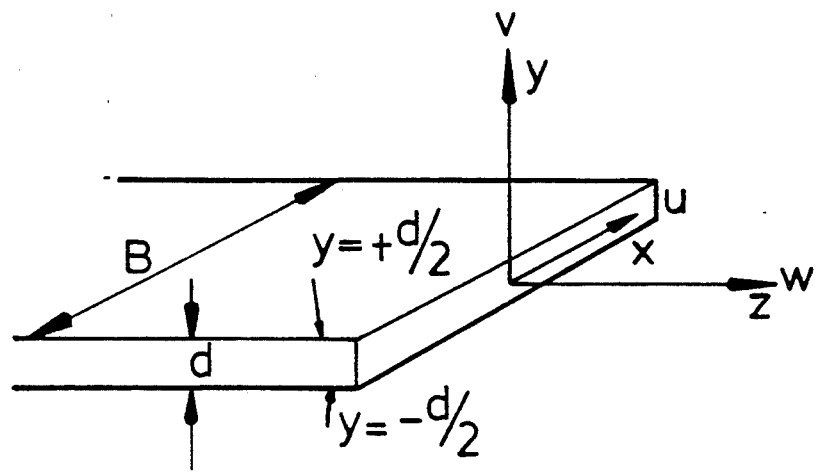

United States Patent [19]

Bush

[11] Patent Number: 5,264,261

[45] Date of Patent: * Nov. 23, 1993

[54] FIBRE REINFORCED POLYMER COMPOSITIONS AND PROCESS AND APPARATUS FOR PRODUCTION THEREOF

[75] Inventor: Stephen F. Bush, Cheshire, United Kingdom

[73] Assignee: Prosyma Research Limited, Poynton, United Kingdom

[*] Notice: The portion of the term of this patent subsequent to Jul. 21, 2008 has been disclaimed.

[21] Appl. No.: 375,001

[22] PCT Filed: Dec. 7, 1987

[86] PCT No.: PCT/GB87/00883

§ 371 Date: Jul. 21, 1989

§ 102(e) Date: Jul. 21, 1989

[87] PCT Pub. No.: WO88/04228

PCT Pub. Date: Jun. 16, 1988

[30] Foreign Application Priority Data

Dec. 6, 1986 [GB] United Kingdom ............... 8629216
Jun. 10, 1987 [GB] United Kingdom ............... 8713513

[51] Int. Cl.⁵ .................... B29C 47/00; B29C 47/12; B29C 47/20; B29K 105/12
[52] U.S. Cl. .................... 428/36.4; 366/336; 366/337; 428/222; 428/221; 428/292; 428/105; 428/107; 428/108; 428/112; 428/113; 428/114; 428/297; 428/303; 428/401; 425/200; 425/204; 425/205; 425/206; 425/461; 425/465; 425/466; 425/467; 425/376.1; 425/382.4; 425/542; 264/108; 264/176.1; 264/299; 264/328.18; 264/209.1; 264/209.7; 264/209.8; 264/210.6
[58] Field of Search ............... 366/336, 337; 428/36.4, 428/222, 292, 457, 105, 107, 108, 112, 113, 114, 220, 247, 303, 323, 327, 332, 339, 401, 221; 264/108, 176.1, 299, 328.18, 209.1, 209.7, 209.8, 210.6; 425/200, 204, 205, 206, 461, 465, 466, 467, 376.1, 382.4, 542

[56] References Cited

U.S. PATENT DOCUMENTS

| | | | |
|---|---|---|---|
| 4,087,222 | 5/1978 | Noel | 425/382.4 |
| 4,100,240 | 7/1978 | Bassani | 428/36.4 X |
| 4,170,446 | 10/1979 | Schutz et al. | 366/337 X |
| 4,389,361 | 6/1983 | Messerly | 264/108 |
| 4,500,595 | 2/1985 | Gerteisen et al. | 264/108 X |
| 4,627,472 | 12/1986 | Goettler et al. | 428/36.4 X |
| 4,692,030 | 9/1987 | Tauscher et al. | 366/337 |
| 4,695,509 | 9/1987 | Cordova et al. | 428/267 |
| 4,705,660 | 11/1987 | Demarle | 264/108 |
| 4,789,511 | 12/1988 | Bilgin | 264/108 |
| 4,883,421 | 11/1989 | Morgan | 425/382.4 |

FOREIGN PATENT DOCUMENTS 2081638 2/1982 United Kingdom ............... 428/36.4

Primary Examiner—Ellis P. Robinson
Assistant Examiner—William P. Watkins, III
Attorney, Agent, or Firm—Spensley Horn Jubas & Lubitz

[57] ABSTRACT

Fibrous network structures are produced within liquid polymer resins by passing the fiber-containing resin along a channel having a plurality of sets of flow modifying elements which establish a regulated succession of velocity profiles for the principal flow direction and the two directions perpendicular thereto. The individual velocity profiles persist over distances which are small compared to the channel dimension over which they are established and are such that there is substantially no net deviation from the principal flow direction. The velocity profiles superimpose on each other to cause rotation and sliding of the fibers so that a coherent network structure is built up which persists through extrusion dies and molds into the solid state. By means of a large number of touches per fiber the structures thereby established confer efficient mechanical reinforcing properties and enhanced thermal properties on the polymer composition.

40 Claims, 11 Drawing Sheets

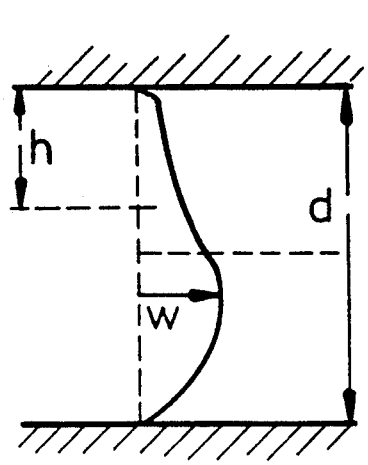
FIG.4a
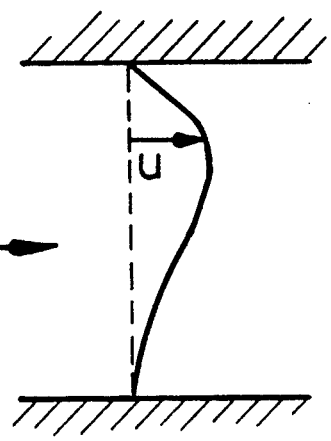
FIG.4b
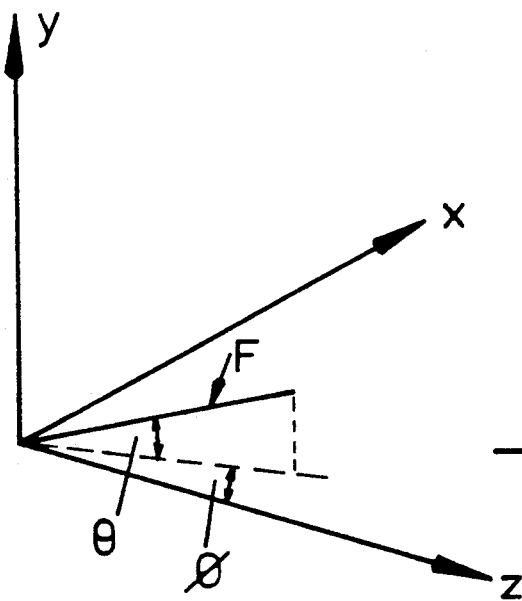
FIG.4c
FIG.5

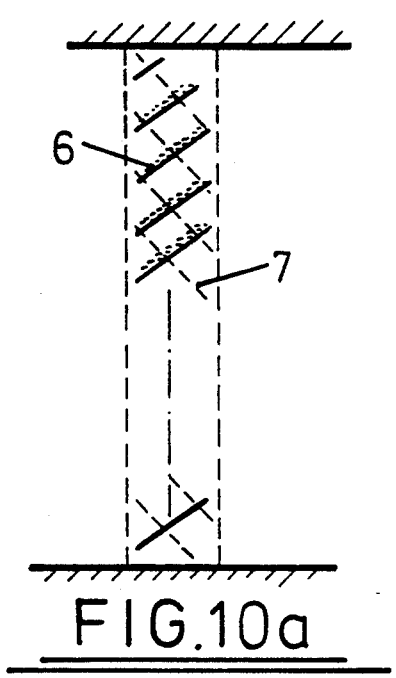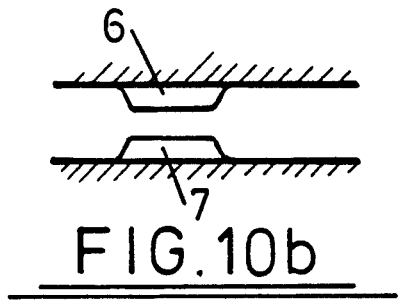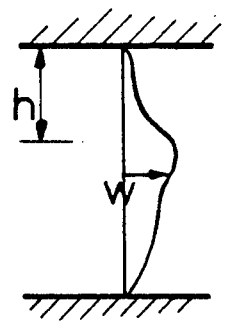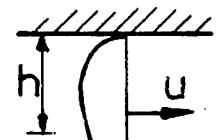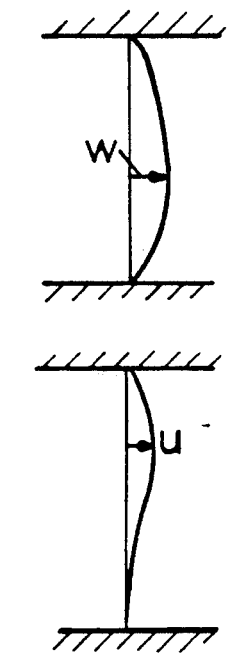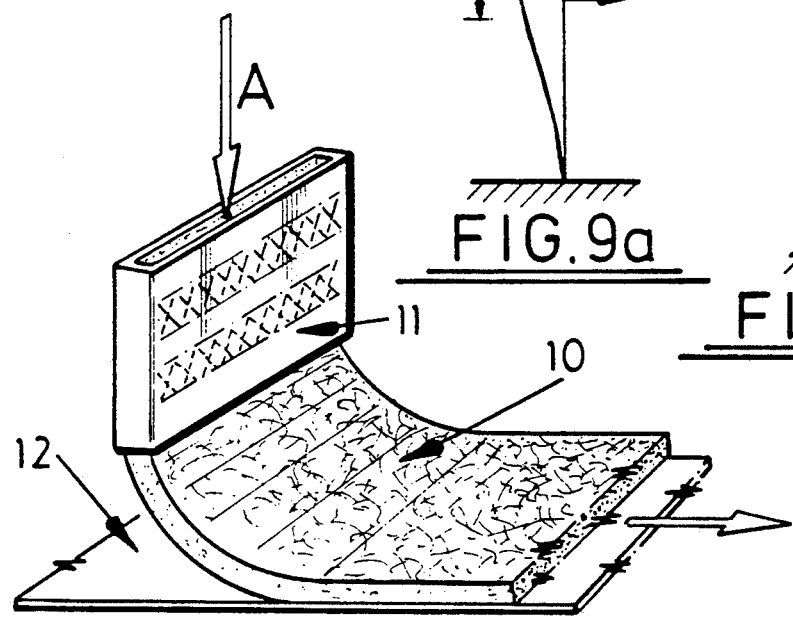

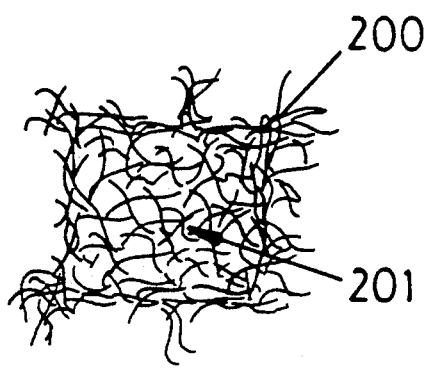 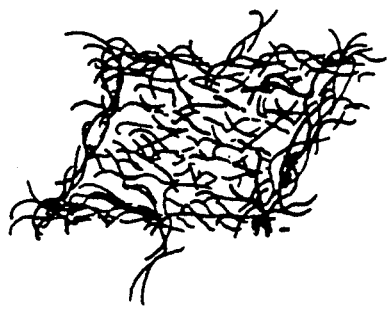
FIG.19a     FIG.19b
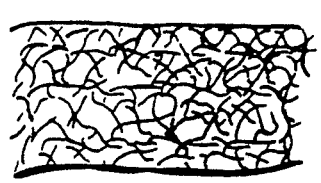 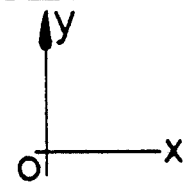
FIG.20a
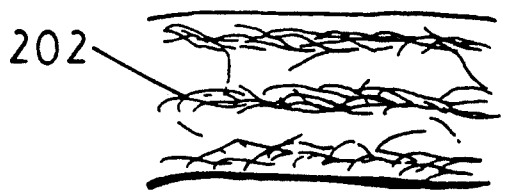 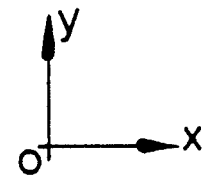
FIG.20b
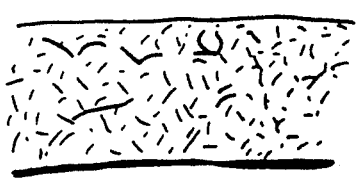 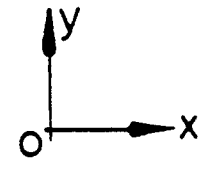
FIG.20c

FIBRE REINFORCED POLYMER COMPOSITIONS AND PROCESS AND APPARATUS FOR PRODUCTION THEREOF

This invention relates to the manufacture of fibre reinforced polymer and prepolymer artefacts particularly (but not exclusively) those arising from extrusion, injection moulding and preimpregnated sheet or mat preparation.

It has long been appreciated that the addition of glass or other stiff fibres to a thermoplastic or thermoset in a suitable fashion usually brings increased stiffness and strength to the processed material. In the case of thermoplastics the glass fibre has until recently been short often in the range of 0.3-0.6 mm. In the case of thermoset compositions the fibres have either been long (c.25 mm) discrete fibres or continuous through a very considerable proportion of the artefact. If long discrete fibres are used they are usually either constructed into a loose woven mat and then impregnated with thermoset materials or scattered in a random overlapping fashion on to a layer of polymer with further polymer poured on top. In either case a form of semi-coherent fibre structure is obtained within the polymer liquid, this structure being maintained after the composite sets to solid. This coherent structure is one of the main reasons why fibre reinforced thermoset composites tend to show greater strength and stiffness than do the thermoplastic varieties based on shert fibres, which do not usually form such structures. Such short-fibre compositions have an advantage however in that they are processed in the same continuous or automatic ways which are used for thermoplastics on their own.

As will readily be appreciated the thermoset advantage carries with it a processing disadvantage by comparison with its thermoplastic competitor in that generally a good deal of semi-manual intervention is required.

Over the last few years polymer granules with relatively long (3-15 mm) glass fibres have become available for automatic processing, particularly by injection moulding. While these can show considerable advantages over their short fibre (0.3-0.6 mm) counterparts in some applications, the flow fields set up by the die or moulds to shape the artefacts exercise a major adventitious influence on the material properties of the finished artefact (as they do with short fibres). In particular, for flows with a predominant velocity component in one direction as in extrusion and many mouldings, fibres tend to be disposed very largely in that direction.

When reinforcement is required in all directions, as it usually is, such particular fibre orientations give rise to major weakness in the perpendicular direction.

Besides the objective (a) of increasing the strength and stiffness of organic polymer matrices, fibre structures may also be required in some applications to meet other objectives either singly or in combination. These include (b) improvements to the thermal conductivity of the composition so that for instance it may be cooled faster after shaping thereby permitting higher rates of production, (c) reduction of the net thermal expansion and contraction of an artefact subjected to environmental temperature changes, (d) with electrically conducting fibres, to permit the passage of appreciable electric current between two points of the artefact at moderate potential difference so that for instance parts of the artefact may be fused to other artefacts, (e) again with electrically conducting fibres to inhibit the passage of electromagnetic radiation through extended surfaces of an artefact (e.g. a panel or cylinder) in order to protect for instance an electronic system from interferences.

Hitherto such reinforcing structures (as distinct from the short-fibre compositions which do not form such structures) have been constructed before being brought into contact with a liquid resin or molten polymer. This method has two broad disadvantages in that first the reinforcing structure must be made to confirm to the artefact shape in a separate manufacturing step and secondly special steps must be taken in the shaping process to ensure that fibres are in sufficient contact with the resin or polymer, i.e. the fibres are well wetted by the resin or polymer. It is not only the fact that the structure is preformed which inhibits wetting: the fact that as mentioned above the fibres are usually themselves bundles of monofilaments sets an additional obstacle to effective wetting.

In practice, wetting is generally achieved by pressing or sucking or spraying the polymer or resin into suitably thin layers of the reinforcing structure and then adding more layers until sufficient thickness in the artefact has been built up. With some combinations of fibre construction and expensive high performance polymers one such layer may be sufficient however.

Such reinforcing methods inevitably produce a laminate construction in which there is small or zero degree of fibre contact from layer or layer. On the other hand when in well-known technology short fibre filaments (usually of lengths 0.3 to 0.6 mm) are mixed with polymer or resin prior to shaping the distribution of fibres may well be substantially uniform through the artefact but no structure is obtained because the average number of contacts per fibre is too small.

It is an object of the present invention to provide a process and apparatus for producing network structures in situ in a polymer resin containing discrete fibres, as well as new polymer products incorporating such structures.

In the following descriptions polymer resin, will be taken to include polymer melts, prepolymer liquids, viscous liquids generally.

According to a first aspect of the present invention there is provided polymer resin processing apparatus comprising a channel with a principal flow direction along which fibre containing resin may flow defined by fixed surfaces, said channel having sets of flow modifying elements adapted to superimpose a regulated succession of velocity profiles on the principal flow direction and on the two directions perpendicular thereto, the flow modifying elements being so dimensioned and orientated and the sets being so positioned relatively to each other such that the velocity profiles established by each such set only persist over a distance which is small compared to the flow direction dimension of the channel and to the principal transverse dimension of the channel and such that resin entering the first set at a particular position in the cross-section of the channel exits from the last set at substantially the same position on the cross-section.

According to a second aspect of the invention there is provided a process for the preparation of a fibre filled liquid polymer composition comprising passing liquid resin containing discrete fibres along a flow channel adapted to impose on the resin a regulated succession of velocity profiles on the principal flow direction and on the other two directions perpendicular thereto, the individual profiles persisting over distances which are small compared to the principal flow direction dimension of the channel and to the principal transverse dimension of the channel, the profiles being such that resin at a particular position on the cross-section of the channel where the first of the sequence velocity profiles is imposed is at substantially the same position on the cross-section of the channel immediately after the last of the sequence of velocity profiles has been superimposed and such that the mutually perpendicular velocity profiles superimpose on each other so as to result in rotation and/or sliding of the fibres relative to the resin such that as the resin passes along the channel the fibres build up a network structure.

The invention is applicable particularly to the formation of fibre structures in thermoplastic resins which are then extruded to form, for example, sheet or pipe. It is however also within the scope of the invention to form the fibrous structure in a thermoplastic resin which is to be moulded, or in a thermosetting resin which is subsequently cured.

The mutually perpendicular velocity profiles established in the resin superimpose on each other and cause the fibres to rotate and/or slide relative to the resin and to each other by a degree which is dependent on the position and orientation of the fibre in the resin, passing from one element to the nest. Preferably the velocity profiles established for the flow direction and the width (or circumferential extent) of the channel are more significant than those established for the depth dimension of the channel. The movement of the fibres cause the fibres to criss-cross over each other with some of the fibres becoming inserted in the interstices between overlapping fibres to form a broadly coherent interlaced or semi-woven structure within the polymer resin. The structure so established in the fluid state may be deformed as a result of fibres sliding relative to each other but otherwise persists undisrupted after passing through or into shaping dies or moulds into the solid state.

The flow modifying elements may be provided by projections, vanes or passages whose dimensions are small compared with the lateral and flow direction dimensions of the channel.

The invention rests on five concepts:
(a) Sufficiently long discrete fibres (e.g. 5-15 mm) can be made to move in specific ways relatively to a resin (rather than just following it) and to each other by the superposition of sequences of velocity profiles on the basic flow (usually unidirectional) along a channel leading to, for example, forming dies or moulds.
(b) through choice of particular velocity profile sequences, this relative motion can be used to form semi-woven or lace-like structures within the fluid flow. These structures can deform without disintegration under the influence of shaping dies or moulds downstream of the said channel and they persist into the solid artefact. The orientation of fibres within the structure can be largely controlled to match the mechanical and other demands placed on the solid artefact. For example, the fibres may be orientated transversely as well as along the channel direction.
(c) as discussed more fully below, the coherence and deformability of such structures depends on the number of near-touches (which term as used herein to mean approach of two fibres within a distance of less than one fibre diameter—including actual contact) which an average fibre makes on other fibres. The near-touches act as slider-hinges in the structure and allow the necessary adaptation to the flow in the dies and moulds. The average number (N) of such near-touches per fibre is given approximately by:

$$N \sim Ac(l/d) \quad (1)$$

where A depends on the structure-type and to some extent on the volume fraction of fibres but is in the range of 0.5 to 2.5 for the structure obtained with this invention 'c' is the volume fraction of fibres, 'l' their length and 'd' their diameter. Poor structures will have A much less than 0.5 and, in the limit, where the fibres form no structure at all (e.g. when they are all aligned in one direction) A is O.
(d) to both facilitate the forming of a structure on a sufficiently fine scale and to avoid in fluids such as polymers, a distorting elastic memory effect in the bulk flow (which would show up as a twist in a moulding or non-uniform swell in an extrudate for example), the sets of individual velocity profiles are arranged so that, averaged over distances which are small compared with the lateral dimensions of the channel, the mean flow is always in the channel direction (i.e. bulk cross flows are eliminated).
(e) it follows from (c) and (d) that for optimum effect, particular scale relationships connect the fibre concentration c, aspect ratio (l/d) and the design of flow modifying elements.

The flow modifying elements may be incorporated in the die passages in the case of extrusion, or the mould runners in the case of injection moulding. The elements are designed and arranged to create a network, e.g. a lace-like or semi-woven structure within the resin more or less uniformly across the width of a sheet, around the perimeter of a hollow section or through the thickness of a solid section. A variety of structures may be obtained by different designs and dispositions of the elements. The elements work by causing a regulated sequence of velocity changes which extend over lengths which are small compared with the maximum dimension of the extrudate section but which are of the same order as the fibres. These scale relationships are crucial to obtaining both the type of structures required and the uniformity across a section on which a satisfactory product depends. The essential point is that the gross motion of the resin along the die is not disturbed on a scale large enough to impose a different flow history on any appreciable part of the extrudate from that pertaining to the extrudate section as a whole. This provides an important advantage over other systems, for instance spiral flows obtained by static or rotating die core means, as well as applying naturally to non-circular hollow and solid sections, which they do not.

Typical thermoplastic compositions include for instance nylons, polypropylene, polyethylene, copolymers of these, matrix modifying materials such as EDPM rubbers, together with a proportion of fibre materials typically glass fibres. Coherent fibre structures and significant benefits can be obtained with the volume of fibres lower than 1% of total volume: typically the volume of fibres might be in the range 1-8% though higher proportions may be employed.

Typical thermosetting compositions include for instance unsaturated polyester resins, fillers and other additives together with a proportion of fibre materials as for thermoplastics. As such both finished mouldings and pre-impregnated sheets and other forms may be prepared, the fibre structures herein replacing existing forms of fibrous reinforcement e.g. chopped strand mat, woven rovings etc.

In addition to sequences of velocity profiles a sequence of viscosity profiles through the resin may be employed to influence the fibre structure. This is of importance where as in pipe extrusion the pressure and time of application of pressure available to obtain a good surface finish is necessarily limited. Thus within and between the flow modifying elements and the shaping mould or die, one or more surfaces of the channel may be heated above the temperature of the preceding part of the channel to establish a viscosity profile in the resin at right angles to the channel direction. The temperature differential established in the resin may be 5°-25° C. This has the effect of reducing the concentration of fibrous material in the immediate vicinity of the surface thereby improving the surface finish. Where increase of the fibre concentration near the surface is required, the reverse procedures may be applied.

The reinforcement which may be incorporated in the polymer materials are fibres of discrete lengths (e.g. 5-15 mm) which are short compared with any appreciable length of extrudate; in particular they are short compared with the maximum dimension of a hollow section or the width of a sheet, but they are not necessarily short compared with the wall thickness of a hollow section or with the thickness of a sheet. Within these constraints a further distinction as to fibre length is drawn which is important to the main applications of the invention. Short fibres are defined as those which, at the preferred loadings in the polymer, on average do not directly affect the motion of another fibre as the polymer composition moves through the processing machinery. Long fibres are those which on average influence by touching or coming nearer than a fibre diameter one or more fibres.

A number of manufacturers supply polymer material for use in the process in the form of fibre filled thermoplastic granules.

A further aspect of the invention resides in new polymer products per se which may be obtained using the above described method and apparatus. In accordance with this aspect of the invention there is provided a fibre filled polymer product comprising a polymer matrix containing a network of discrete fibres in which the orientation of the fibres is substantially independent of the axis along which resin has flowed during manufacture of the product, the network being comprised of major strands of a plurality of filaments and in-fill of mainly single filaments in spaces bounded by the major strands wherein the average number of near touches N (as herein defined) which each fibre makes with adjacent fibres is in the range $0.5 \times c$ (l/d) to $2.5 \times c$ (l/d) with a minimum value of 8, where c is the volume fraction of the fibres in the product and is in the range above 0.005 to 0.1 for a thermoplastic and in the range above 0.005 to 0.4 for a thermosetting resin, and l/d is the aspect ratio of the fibres.

Preferably N is in the range $0.8 \times c$ (l/d) to $2.5 \times c$ (l/d).

In the case of a thermosetting resin, the viscosity thereof is much lower than that of the thermoplastic melts and as such it is possible to use higher volume fractions of fibres (due to the fact that they are more easily wetted). In such a case, the volume fraction may be up to 0.4.

Preferably c is in the range 0.001 to 0.08, more preferably 0.005 to 0.05. The fibres are preferably monofilaments and preferably have a length of 3 to 15 mm. In one advantageous embodiment of the invention, the fibres may be electrically conducting and the product is such that the network structure prevents the passage of electromagnetic waves through the material. In another embodiment, the fibres may have at least 10 times the conductivity of the polymer, and the network structure increases the thermal conductivity of the product by at least one third $\times c \times$ thermal conductivity of the fibres.

The term A in the above equation may be considered to represent a 'structure efficiency'. A low value of A means an ineffective structure (e.g. fibres lying predominantly in one direction) so far as number of touches are concerned. Prior art moulding and extrusion of fibre filled polymers use comparatively high fibre volume fractions and produce adventitious structures which are comparatively inefficient. The significance of the product of the invention is that a more efficient network structure is obtained, at lower fibre concentrations, than in the case of the adventitious structure obtained in the prior art particularly is this so with extrusions where only very low values of A will be obtained adventitiously; the structure of the product of the invention can also comprise a much higher proportion of fibres orientated at right angles to the predominant extrusion or mould direction than would be obtained adventitiously.

In the fibre structure, the fibres are not knotted or significantly twisted together, but the interlacing or interweaving of the fibres typically but not necessarily in the length range 3 to 15 mm, achieves the required number of near-touches per fibre to permit a degree of relative movement without disruption between different parts of the structure in both the liquid and solid states of a resin. The structures can be produced without the use of specific fibre matrix coupling agents.

When the average number of near-touches exceeds a certain number which will vary somewhat with the particular construction employed but is typically of the order of eight to thirty (e.g. ten to twenty) a recognisable coherent three dimensional structure can be set up by control of the motions within a polymer resin which is not significantly disrupted by subsequent shaping and which will persist even after the solid polymer is subsequently removed. The number of near touches in the fibre filled product may be determined by microscopic examination of the network structures is the solid state. The coherence of the structure may be checked by burning off the polymer matrix and the fibre structure remaining be further examined.

If the basic fibre diameter is of the order of a few microns (as with monofilaments of glass or steel for example), the required number of contacts can be obtained with reinforcement loadings of a few percent by volume and filament lengths of a few millimetres upwards, according to the approximate relationship (1) given above.

If some monofilaments are present as bundles then those bundles act as one fibre of relatively low aspect ratio in relationship (1) so far as building a structure is concerned, thereby reducing the effectiveness of the fibre material present though not preventing it participating in the structure.

At loadings of 0.5 to 8 percent based on monofilaments of 3 to 15 mm length and 8-15 $\mu$m diameter the reinforcement works to maximum effect i.e. where mechanical load is applied a very high proportion of the fibres in the load direction will bear load to their natural limit in marked contrast to constructions where bundles of monofilaments constitute the basic fibre elements. In such constructions long lengths of filaments are weakened below their natural strength limits by being knotted or twisted round other filaments. This does not mean that loadings outside the given ranges will not yield substantial reinforcement and other advantages. In fact for a given structure and test direction relative to it, the tensile strength and stiffness of a composition according to the invention are broadly proportional to the volume fraction of fibre up to at least 8% and increase further beyond this fraction.

If the structure formed within the liquid resin or polymer is to survive the shaping process it must be deformable without being disrupted. This is achieved by systematically bringing fibres (usually filaments) to within a fibre (usually a filament) diameter or less of each other in the molten polymer. The force to separate them is then very large but fibres may rotate or slide at their contact points much more easily. The structure is then able to conform to the shaping process without being disrupted.

The basic repeating pattern of the structure in at least two of three mutually perpendicular directions at a point in the artefact must be of dimension small compared with the extent of the artefact in that direction. This scale relation is crucial to ensuring the extension of the structure throughout the artefact and to ensure its uniformity. Both features are essential for minimising any post-forming distortion in the artefact arising from cooling or later environmental temperature variation, and for obtaining a uniform response to mechanical loading.

The invention may be employed for any of the objectives (a) to (e) mentioned above, with products which may be extruded as hollow sections or solid profiles or be formed by injection moulding. Thermoplastic sheet extrusions containing fibre structures made according to the invention may be further shaped by thermoforming under pressure or vacuum to obtain a wide range of artefacts, without significant disruption of the structure. This is possible because the absence of significant twisting or knotting of the fibre filaments, ensures that there is sufficient give in the structure so that filaments can more relative to each other and to the polymer under such deformation.

Similarly for the same reasons pre-impregnated thermosetting forms may be further formed under pressure or vacuum to obtain a wide range of artefacts.

Figure 2A:
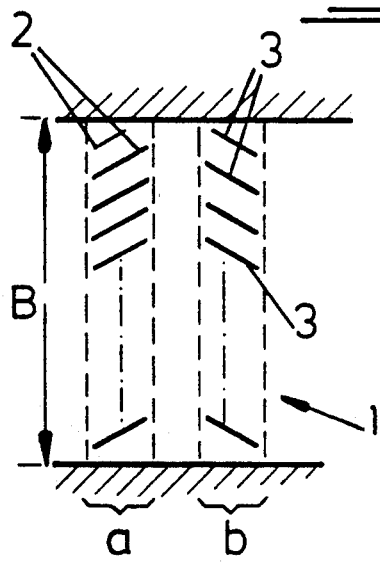
Figure 2B:
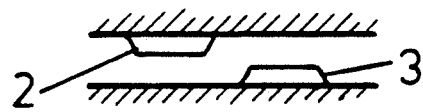
Figure 6A:
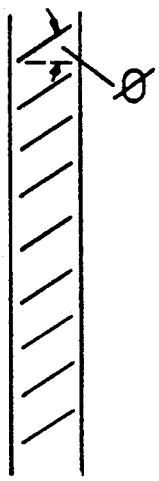
Figure 6B:
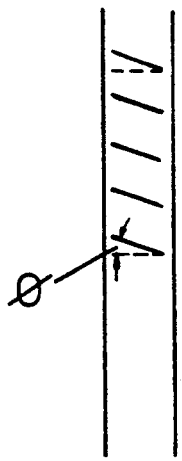
Figure 6C:
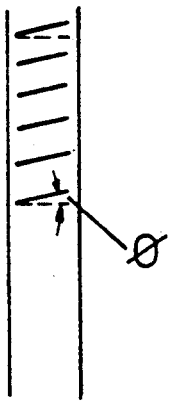
Figure 7:
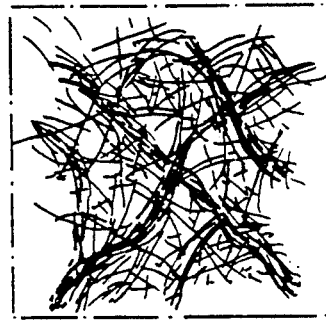
Figure 8A:
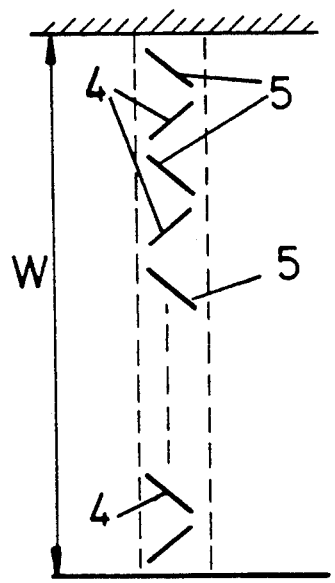
Figure 8B:
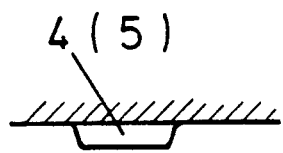
Figure 12:
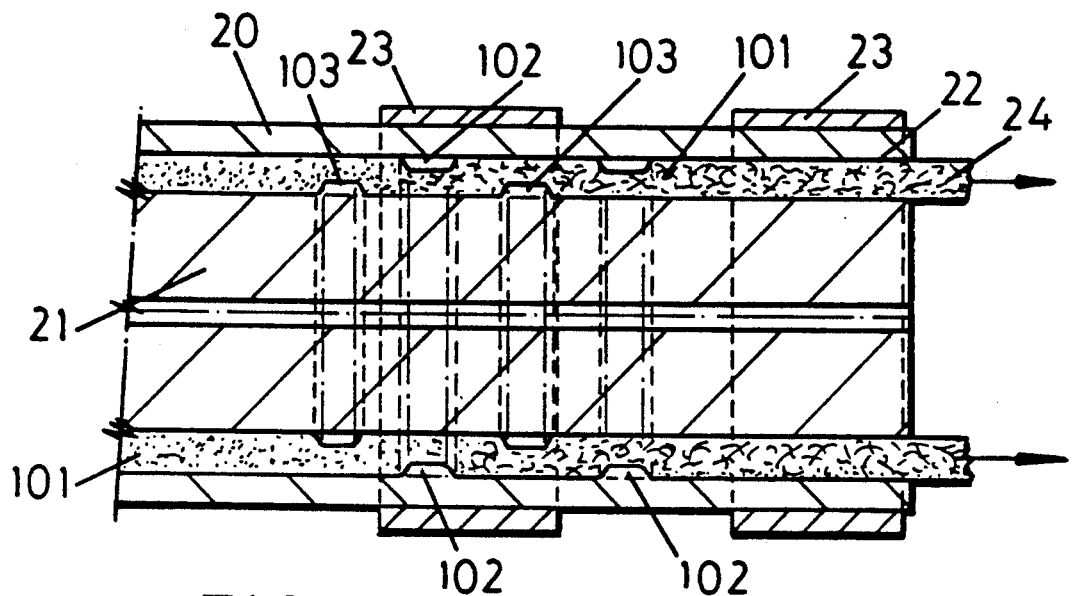
Figure 13:
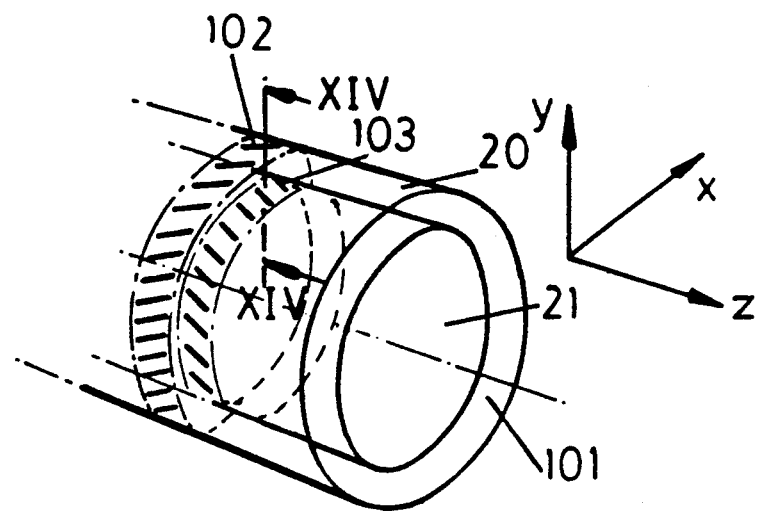
Figure 14:
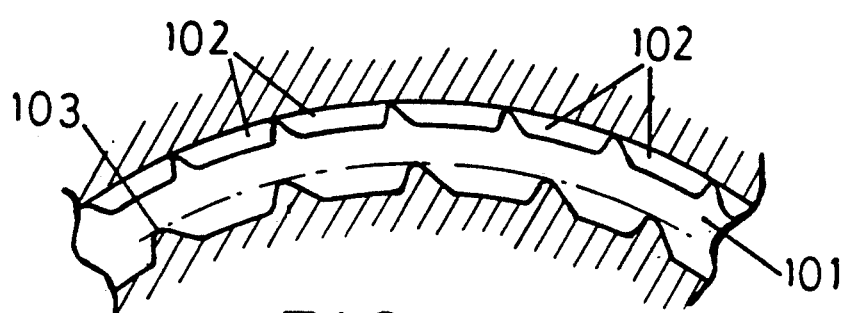
Figure 15A:
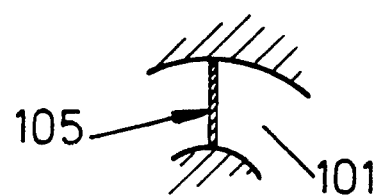
Figure 15B:
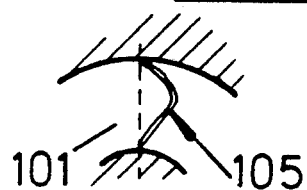
Figure 15C:
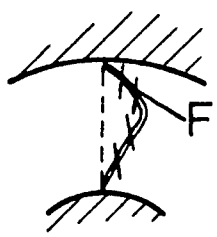
Figure 16:
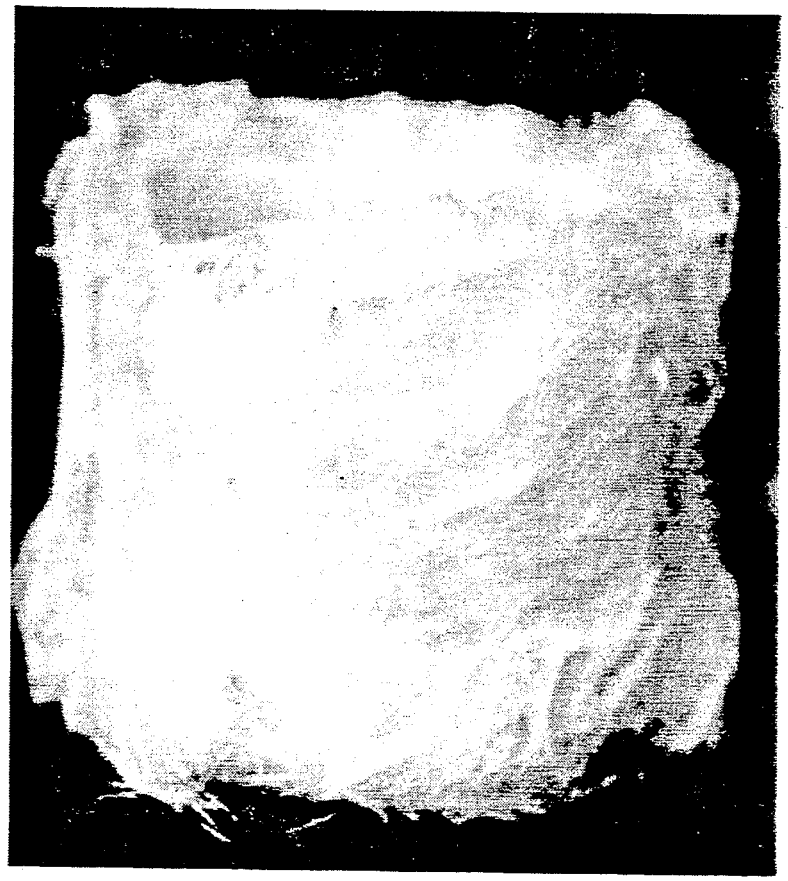
Figure 17:
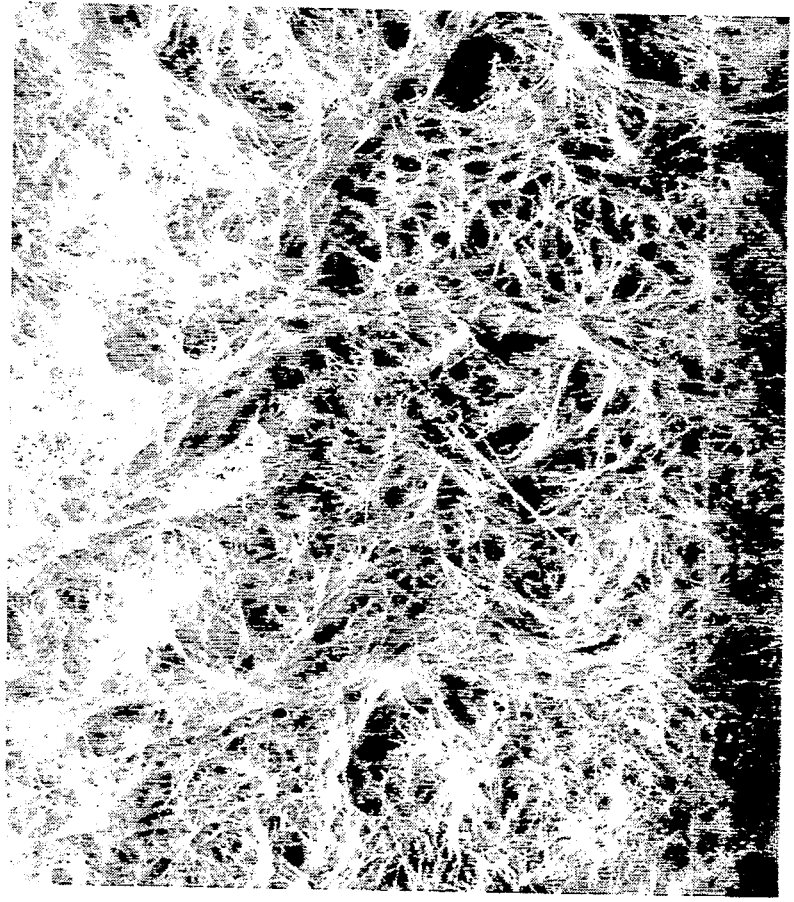
Figure 18:
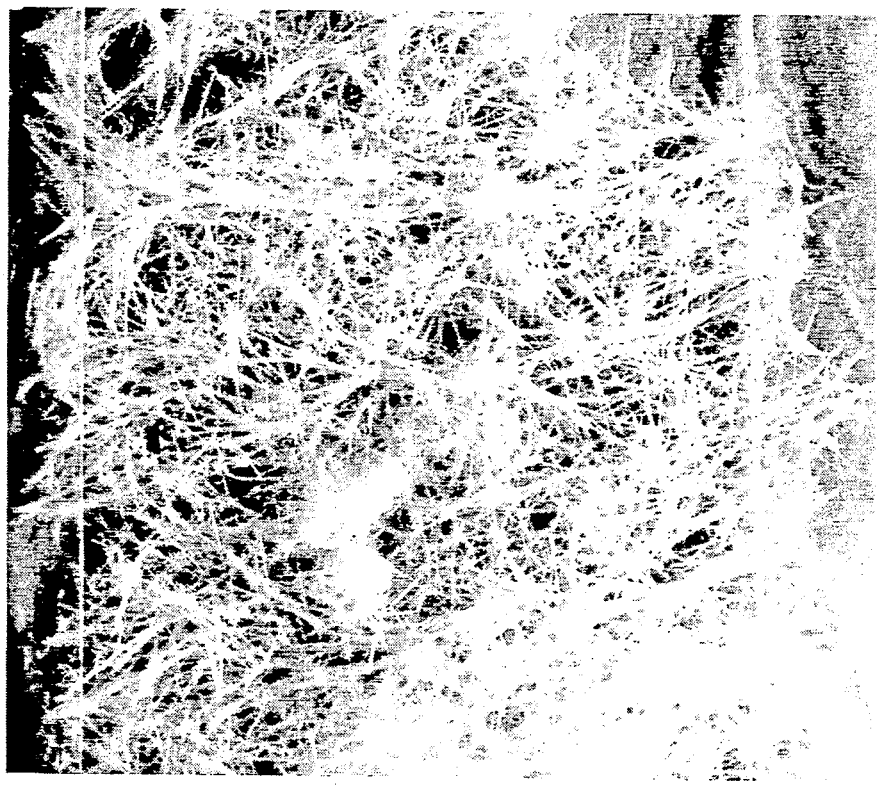

The invention will be further described by way of example and with reference to the accompanying drawings, in which FIG. 1 defines a co-ordinate axis system for the invention as applied to the production of sheet, FIGS. 2a and 2b illustrate one arrangement of flow modifying elements which may be used in the apparatus of the invention, FIGS. 3a–3d illustrate the profile of one form of flow modifying element, FIGS. 4a to 4c illustrate velocity profiles obtained using the arrangement of flow modifying elements in FIGS. 2a and 2b, FIG. 5 illustrates the orientation of a fibre, FIGS. 6a–6c illustrate the manner in which fibres are orientated by the superimposition of the velocity profiles in FIGS. 4a to 4c, FIG. 7 illustrates a network structure obtained using the arrangement of FIG. 2, FIGS. 8a and 8b show further arrangements of flow modifying elements which may be used, FIGS. 9a and 9b are velocity profiles obtained using the arrangement of FIG. 8, FIGS. 10a and 10b show a further arrangement of flow modifying elements, FIG. 11 illustrates the production of sheet using an apparatus of the invention, FIG. 12 illustrates apparatus for producing tubular extrusions, FIG. 13 illustrates the arrangement of vanes used in the apparatus of FIG. 12, FIG. 14 is a section on the line XIV—XIV of FIG. 13, through one ring of vanes shaped for material flowing from the left, FIG. 15 illustrates the curing of weld lines, FIGS. 16–18 are photographs of fibre structures obtained using the invention, FIGS. 19 and 20 illustrate properties of various fibre reinforced polymer products.

The invention will now be described firstly for the production of fibre reinforced sheet followed by hollow sections followed by injection moulding. Notwithstanding its primary application to long fibres as defined above the invention may be applied with advantage to the case of short fibres, and this will be referred to where appropriate.

Reference is firstly made to the co-ordinate system of the rectangular section channel 1 of FIG. 1 which is of a breadth B and a depth d. The channel as illustrated is taken to be oriented so that the plane surfaces of the sheet as extruded are horizontal. The x and z axes lie in the central horizontal plane of the apparatus with $O_z$ in the direction of extrusion and $O_x$ at right angles, i.e. in the transverse direction. $O_y$ is normal to the central plane in the upward direction. $O_{xyz}$ thus form a conventional left hand co-ordinate system.

One embodiment of apparatus for use in producing sheet is illustrated in FIGS. 2a and 2b.

FIGS. 2a and 2b illustrate a first configuration of flow modifying elements in the channel 1. These flow modifying elements (referred to as vanes) are located upstream of an extrusion die (not shown).

The vane configuration shown in FIGS. 2a (which is a view along $O_y$ from plane $y = -d/2$) and 2b (a view along $O_x$) is referred to herein as the L-R configuration and comprises a transverse row (a) of a plurality of elongate vanes 2 projecting downwardly from the upper surface ($y = +d/2$) of the channel 1 and arranged (within the row) generally parallel to each other at an angle $+n°$ relative to $O_z$. A plurality of vanes 3 (similar to vanes 2) arranged in a transverse row (b) project upwardly from the lower surface ($y = -d/2$) of the channel 1. Within the row (b) the vanes are parallel to each other and will generally, but not necessarily, be at an angle $-n°$ relative to $O_z$. A plurality of such rows (a) and (b) are provided alternately along the length of the channel typically separated by a distance broadly of the same order as the vane length. For example a total of (4) of such rows may be provided.

Figure 3A:
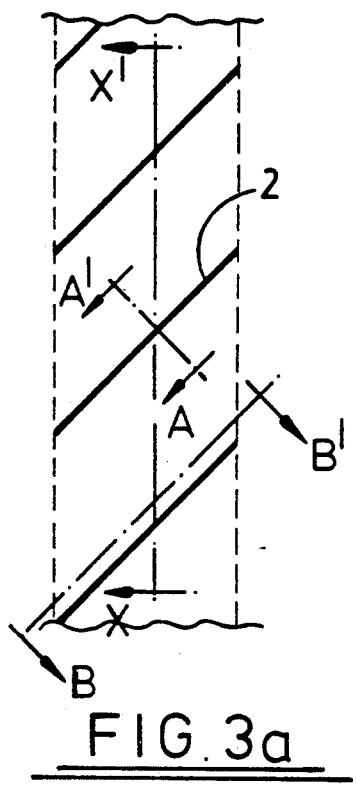
Figure 3D:
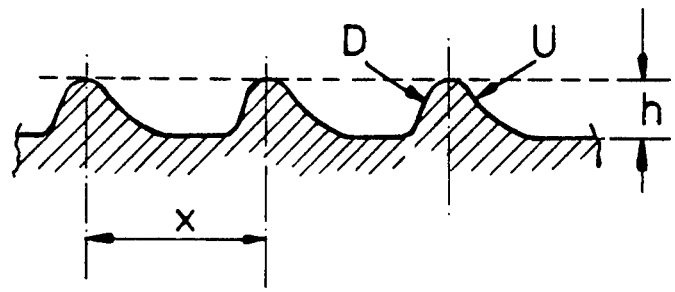
Figure 3B:
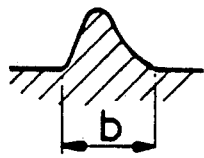
Figure 3C:
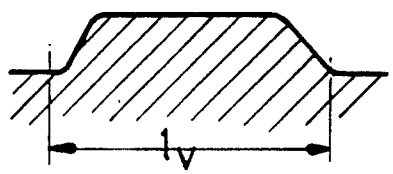

In order to illustrate the shape of a vane 2, reference will now be made to FIGS. 3(a)–(d) which illustrate a vane for resin moving left to right as viewed in FIG. 3a. FIG. 3(a) illustrates a portion of a row (a) of the apparatus of FIG. 2 showing vanes 2 represented (as straight lines) by the locus of the highest points on the vane. FIGS. 3(b)–(d) are respectively cross-sections on the lines A—A', B—B' and X—X' of FIG. 3a looking in the directions indicated by the arrows. The height h of the vane will generally be between one-third and two-thirds (e.g. between one-third and a half) of the depth d of the channel 1 (or width of annulus for hollow sections). The width (b) of the vane will be a small fraction of the vane length ($l_v$). The vanes are desirably shaped to avoid significant weld lines downstream of the vanes. Such a weld line is created by a sufficiently sharp change of geometry in the die that two neighbouring stream lines diverge with solid surface in between them. With purely rectangular vanes such divergence is obtained at the outer edges. Such divergence may be totally or in very large measure avoided by shaping the leading and trailing edges of the vanes so as to have smooth radii in each plane in the light of the elastic properties of the fibre-bearing polymer. Thus, the right hand end of the vanes as shown in FIG. 3(c) will be a curve which conforms smoothly with the right hand side face as shown in FIG. 3(b). Similarly, the left hand end of the vane FIG. 3(c) will conform smoothly with the left hand side face (FIG. 3(b)). Generally in the light of the elastic properties of the fibre bearing polymer, the upstream approaches U (FIG. 3(d)) to the vane will be distinctly more gradual than the downstream faces D. This allows the streamlines to change direction without interposing solid surfaces between two neighbouring stream lines.

Purely by way of example, the dimensions of the vanes illustrated in FIGS. 3(a)-(d) for use in the production of flat sheet of the order of 3 mm depth may be as follows:

Height h = 1.0 mm
Length $l_v$ = 6.0 mm
Width b = 1.2 mm

The transverse spacing of the vanes within the row, as depicted by x in FIGS. 3(d) may be 5 mm.

Fibre lengths ($l_f$) are chosen to match a number of constraints but desirably they will be somewhat shorter than vane lengths ($l_v$) but long enough to meet the criterion for long-fibre behaviour defined above. This behaviour is also a function of the fibre volume fraction in the polymer-fibre composition: the shorter the fibre length ($l_f$) the greater the volume fraction of fibre required to achieve a coherent structure, as indicated by relationship (1). The invention thus provides flexibility in choosing $l_f$ to conform with the geometry of the die, a benefit of particular importance for extruding thin sections of order of 1 or 2 mm. Alternatively if the fibre length $l_f$ is constrained by the requirements of the product, then the invention provides means for defining suitable values of h, $l_v$ and b.

The fibre structure created by the L-R configuration (FIG. 2) will now be described with reference to FIGS. 4a and 4b which show velocity profiles established in the channel, and FIG. 5 which depicts the orientation of an individual fibre F in the channel. The row (a) of left deflecting vanes 2 establishes the velocity profiles sketched in FIGS. 4a, 4b and 4c near the outlet from the vane row (FIG. 4a shows the axial velocity w and FIG. 4b shows the transverse velocity u and FIG. 4c shows the velocity v). The fibres F will tend to move towards an alignment angle $\phi$ in the horizontal plane defined to a good approximation for the illustrated apparatus by $$\tan\phi = (\partial u/\partial y)/(\partial w/\partial y) \quad (2)$$

As will be seen from FIGS. 4a and 4b, both velocity profiles ($\partial u/\partial y$) and $\partial w/\partial y$ change sign and magnitude through the depth of the channel. Thus the angle $\phi$ to which a fibre will tend to be orientated will depend on its position in the channel. The effect of the first (L) row of vanes 2 gives the initial structure shown in FIGS. 6(a)-(c) which respectively show fibre orientation in the upper, middle and lower thirds of the depth d of the channel 1. As shown in FIGS. 6(a)-(c) broadly three layers of fibres F with $\phi$ of different sign and magnitude are obtained emerging from the first L-row.

The three layers are as follows:

(i) upper layer
$\frac{\partial u}{\partial y}$ and $\frac{\partial w}{\partial y}$ both negative   (FIG. 6(a))

(ii) middle third of the depth d
$\frac{\partial u}{\partial y}$ positive and $\frac{\partial w}{\partial y}$ negative   (FIG. 6(b))

(iii) lower third of the depth d
$\frac{\partial u}{\partial y}$ and $\frac{\partial w}{\partial y}$ both positive   (FIG. 6(c))

It is in the upper layer that the largest values of $\phi$ are obtained and in the lower layers in which $\phi$ is smallest.

The desirable vane dimensions given above as proportions of the channel dimensions will generally be sufficient for the orientation defined by (2) to be achieved. The fibres thus have a horizontal orientation depending on their position within the channel and a structure of horizontally overlapping fibres will be built up. If nothing else happened there would be little to stop the fibres F realigning to the axial direction in due course. On emerging from the L-row however, fibres will be tilted towards the vertical $O_y$ in varying degrees characterised by angle $\theta$ with the horizontal $O_{xz}$ plane in FIG. 5. The key point is that in the space between the L-row and the following R-row (on the bottom face) the fibre vertical angles $\theta$ will increase or decrease at a rate and in a sense broadly determined by the product (for the case where the vertical velocity component v is small compared with w)

$$\theta = -\cos\phi \sin^2\theta \times \frac{\partial w}{\partial y} \quad (3)$$

Thus some but not all fibres F will rotate sufficiently in the space available—those with the least transverse alignment $\phi$ will rotate most. This rotation $\theta$ of the fibres results in the ends of some of the fibres being inserted between other fibres of high $\phi$ and low $\theta$ in neighbouring levels across the depth of the channel. The result is that a network structure begins to be built up with the various horizontal levels of the fibres being connected by the fibres which have been rotated through the angle $\theta$. Such a structure may be regarded as an interlaced network. It is evident from FIGS. 4(a) and 4(b) and the relation for $\phi$ that alignments emerging from the L-row near the lower surface of the die (y = -d/2) will be small compared with those between the horizontal plane and the upper surface (y = d/2) on which the L-vanes are positioned. A right-ward orienting row of vanes 3 of the lower surface now induces orientation of the same magnitude as vanes 2 of the L-row but in the opposite sense. Vertical rotation of the least aligned fibres creates a second weave on emerging from R-row. The velocity profile for the other perpendicular direction some way away from the exit of a vane, is shown in FIG. 4c. This enhances the rate of rotation $\theta$ but the invention is not dependent on this.

The profile increases θ and also helps to ensure that sufficient fibres enter the next row of vanes with a sufficient angle θ to be slid into the next row.

As well as the rotary motion indicated by relation (3) fibre interlacing is achieved by a sliding motion arising from relative changes in the azimuthal angle φ (FIG. 5). This sliding motion is particularly important for use in channels where as in the example above the depth d may be less than or of the same order as the fibre length $l_f$. An approximate relationship for the change of 0 for a typical channel is:

$$\phi = \tan\theta \left( -\sin\phi \frac{\partial w}{\partial y} + \cos\phi \frac{\partial u}{\partial y} \right) \quad (4)$$

which shows that within a distance equal to a typical vane length $l_v$ a minority of fibres (of high θ) will swing almost completely to the alignment angle given by relation (2) while those with low θ will hardly move at all. Combined with the systematic changes in ∂u/∂y and ∂w/∂y described above this is precisely what is required to achieve an interlaced or woven structure through the channel depth.

The mean bulk flow direction has thus not been deviated from the extrusion direction over any distance significantly greater than a vane spacing which is designedly small compared with the transverse dimension (or perimeter of a hollow section). A portion of the structure which is built up within the liquid polymer is shown in FIG. 7 (using an arrangement of four rows of vanes) and will be seen to comprise a number of major strands (the spacing of which is approximately related to the spacing of the vanes) and an "in fill" of monofilaments in all directions. The overall structure is generally lace-like.

The coherence of the structure depends on the close approach of the sliding or rotated fibres to the majority having substantial orientation φ in the horizontal plane. Subsequent extrusion at the die or flow into a mould will modify but not disrupt this structure, because the resistance to separating two fibres closer than a fibre diameter is much greater than the resistance to their relative rotation.

So far the invention has been described with reference to the L-R vane configuration shown in FIGS. 2(a) and 2(b). Other vane configurations are however possible, to obtain more compact or more open structures with greater or lesser degrees of orientation perpendicular to the main direction of flow.

The vane configuration shown in FIGS. 8a (a view along $O_y$ from plane y = -d/2) and 8b (a view along $O_x$) is referred to herein as the chevron configuration and comprises vanes 4 and 5 provided alternately across the width of channel 1 at angles of +m° and -m° respectively. All vanes 4 and 5 are on the same surface (y=±d/2) of the channel. The vanes 4 and 5 are provided as a transverse row c in the channel, and a plurality of such rows will be provided along the length of the channel.

Velocity profiles established by the chevron configuration are shown in FIGS. 9a and 9b (9a on a section within the chevrons, 9b on a section downstream of a set of chevrons). The structure obtained by use of the chevron configuration is a tighter structure than that obtained with the L-R configuration.

The vane configuration shown in FIGS. 10a (a view along $O_y$ from plane y = +d/2) and 10b (a view along $O_x$) is referred to herein as the twist configuration and comprises vanes 6 provided, at an angle +p° (relative to $O_z$) on the upper surface (y = +d/2) of the channel above vanes 7 provided at an angle -p° (relative to $O_z$) on the lower surface (y = -d/2) of the channel. Vanes 6 and 7 are provided in a transverse row (d) of the die and a plurality of such elements are provided along the length of the channel.

FIG. 11 schematically illustrates the production of a sheet of thermosetting resin using the vane arrangement of FIG. 10 (twist configuration) although the other vane configurations already described could equally be used. A mixture of resin and discrete fibres is fed from a tank (not shown) in the direction of arrow A into channel containing two transverse rows the twist configuration vanes 6 and 7. The sheet 10 containing the network structure emerges from the die lips 11 and is collected on a conveyor 12 for further processing as necessary.

The detailed number, dimensions and disposition of the vanes (2 and 3, 4 and 5, 6 and 7) within each row will vary with each application but will desirably accord with the following principles: the length ($l_v$) of a vane will be at least equal to the depth (d) of the die (or in the case of hollow sections the thickness of the annulus) and usually be a small multiple of this dimension: the vanes in elements of the L-R (FIG. 2) and twist configurations (FIG. 10) will be desirably at a uniform angle of typically either +45° or -45° with respect to $O_z$ on the top and bottom surfaces of the die (or the inner and outer surfaces of a hollow section) except that near the edges of a sheet die the vane angles and lengths may be progressively varied somewhat in order to optimise the edge condition. Generally the vanes will be spaced so that looking along $O_z$ in the plane of either the die surfaces (y = +d/2) the projection of the vanes overlap somewhat but his need not necessarily be so to obtain benefit from the invention.

In elements with the Chevron configuration (FIG. 8) the vanes are of alternate uniform angles typically +45° such that neighbouring vanes approach each other a minimum distance typically of the order of one-third a vane length ($l_v$). As with the L-R configuration the row (c) extends uniformly across the die so that both the fibre structure created and the flow history of the polymer are fundamentally uniform in the transverse direction (or in the perimetral direction for hollow sections). Near the edges of the sheet die the vane angles and lengths may be varied somewhat to accommodate the solid edge presented by the die.

The vanes 4 and 5 of the chevron configuration and the vanes 6 and 7 of the twist configuration may be of the same profile as illustrated in FIGS. 3(a)-(d).

Reference has been made to the application of the invention to hollow sections. One particular arrangement for use in producing fibre reinforced tube is shown in FIG. 12. This Figure illustrates pipe extrusion apparatus comprising an outer cylindrical housing 20 with an inner cylindrical core 21 supported by spiders (not shown). An annular channel 101 is defined between housing 20 and core 21 in one section of which are a plurality of flow modifying vanes 102 and 103 (see FIGS. 13 and 14), the former of which are provided on the inner surface of housing 20 and the latter of which are provided on the outer surface of core 21. Downstream of the vanes 102 and 103 is a conventional hot forming die 22. A cold-forming die (not shown) is provided downstream of die 22. Heater bands 23 are provided as shown. In use of this apparatus, a fibre/polymer mixture from a conventional extruder head (not shown) is fed to channel 101 for passage through the extrusion apparatus and emerges as pipe with a network reinforcement 24. Referring now to FIGS. 13 and 14, a channel 101 is provided with alternating rows of the vanes 102 and 103, which may be of the same profile as shown in FIGS. 3(a)-(d). As shown in FIG. 13, the vanes 102 (as viewed towards the polymer flow) are left deflecting (see FIG. 13). The row of vanes 103 is axially displaced from the row of vanes 102 and, are right deflecting a plurality of rows of vanes 102 and 103 are provided alternately with (i.e. no vane) sections of lengths equal to half a vane length $^1v$ along channel 101. For example a total of 4 such rows (as illustrated in FIG. 12) may be provided. It will be appreciated therefore that the vane arrangements shown in FIGS. 13 and 14 are, in effect, the equivalent in annular form of the L-R vane configurations shown in FIG. 2 for flat sheet.

The production of the fibre reinforcement network within channel 101 occurs in a manner entirely analagous to that described for the L-R configuration shown in FIG. 2.

The advantage of the invention by comparison for instance with a rotating mandrel system which has been used to orient fibres in the circumferential (i.e. $O_x$), is three-fold: (a) it applies without modification to non-circular as well as to circular sections, (b) the emerging extrudate has no bulk circumferential motion which in the rotating case must be counteracted by the stationary cooling die, (c) no mechanical moving parts are involved.

Conventionally the core or mandrel of a hollow section die may be supported by struts or spiders which join it at typically three points to the outer surface. These produce streamline separations in the sense defined above and the consequent weld line if unassisted will not disappear or heal in the time before a typical extrudate emerges from the die face. In particular, fibres tend not to cross such a weld line thereby amplifying the weakness in the subsequent solid product. The process of first orientating in one plane and then rotating in a plane at right angles described in connection with the L-R configuration has advantage in this case. FIG. 15 illustrates the mechanism for achieving this. Looking into the channel with an L-element on the outer channel surface, the weld line 105 is initially vertical (FIG. 15 (a)); on emerging from the L-row of vanes the weld line is distorted as shown in FIG. 15 (b). On proceeding downstream, the component of rotation in the vertical (i.e. $O_{yz}$) plane stitches the fibres F across the weld line. On passing to the R-element the weld line is further diverted (in the opposite direction) and then stitched. The stitching process is assisted by the small component of velocity V (i.e. in the $O_y$ direction) immediately downstream of a vane element.

Although the production of tubular extrusions has been described with specific reference to circular section tubes, the invention is equally applicable to profiles generally including square closed and open rectangular sections.

To illustrate the reinforcing network which may be produced in an extruded tube reference is made to FIG. 16 which is a photograph of a fibre structure (in this case glass fibre) remaining after the polymer matrix has been removed by burning and shows the essentially isotropic orientation obtained. The fibrous network in this case occupies a volume fraction of 7% within the polymer matrix. An appreciable fraction of the fibres are present as bundles of filaments.

FIG. 17 is a photograph of a lace-like fibre structure obtained at about 3% fibre volume obtained using an L-R configuration. FIG. 18 is a photograph of a fibre structure obtained at about 0.9% fibre volume using an L-R configuration where virtually all fibres are present as monofilaments.

Clearly the different sequences and spacing of vane elements can give different network structures. Generally for relatively open lace-like structures (FIGS. 17 and 18) the spacing of the vanes will determine on the average the distance between the main stands of the lace (i.e. the openness of the structure).

Finally, the invention may with advantage be applied to injection moulding particularly where large mouldings (for instance structural foam mouldings, injection mouldings, or blow mouldings) demand relatively large runners prior to the moulding gate. All variants in FIGS. 2, 8 and 10 are applicable. The point here is that gates of several mm, as typically used for such mouldings will permit the passage of the fibre structures created by the vane systems placed in the runners. The advantage is potentially very considerable in that fibre reinforced thermoplastic mouldings normally suffer from fibre alignments which reflect the flow into the mould and not the loading requirements of the said product. The fibre structures created in the runners will thus greatly enhance the uniformity of the injection moulding.

FIG. 19 shows the process of deformation (FIG. 19(a) before deformation and FIG. 19(b) after deformation) without disruption in a typical network structure of the invention, e.g. as shown in FIG. 7. Points like 200 of the main structure act as hinges predominantly, points 201 act as both sliders and hinges. The main structure in this case assumes a trellis-like form. Deformation is naturally easier when the polymer between the filaments is still molten than when it is solid but the requirement to deform is greatest in the liquid state as the artefact is being shaped.

FIGS. 20(a)-20(c) shows how the flow of heat and electricity is affected by the various categories of fibre structure.

In the structure 20(a) made according to the principles of the invention the thermal conductivity of the composition in any direction is broadly proportional to the thermal conductivity of the fibres (where this greatly exceeds that of the polymer) and their volume fraction. In laminate structures 20(b), thermal conductivity in the planes of the laminates 202 is also broadly proportional to the thermal conductivity of the fibres (where this greatly exceeds that of the polymer) and their volume fraction, but perpendicular to the laminate plane (i.e. in the direction Oy in which heat is normally removed for cooling or curing purposes), the overall thermal conductivity is usually governed by the thermal conductivity of the polymer.

For electrical conduction the position is broadly similar, except that the effects are more pronounced when metal fibres are used because of differences of electrical conductivity between metals and polymers are much greater than differences of thermal conductivity. In particular, where as in FIG. 20(c) (the short-fibre case) there is no or little continuity of fibre structure in the Oxz plane (i.e. a plane normal to the paper containing Ox) there will be no screening of incident electromagnetic radiation. Both the structure of this invention (FIG. 20(a)) and that of the conventional preformed laminates (FIG. 20(b)) provide such screening where enough of the fibres actually touch. The advantage of the present invention, whereby a structure is achieved within the resin immediately prior to shaping, is thus very considerably in this application also. This is because many of the artefacts for which such electromagnetic screening is required are moulded from thermoplastic compositions for which the use of preformed fibre laminates 202 is ill-adapted.

I claim:

1. Polymer resin processing apparatus comprising a channel with a principal flow direction along which fibre containing resin may flow defined by fixed surfaces, said channel having sets of flow modifying elements adapted to superimpose a regulated succession of velocity profiles on the principal flow direction and on the two directions perpendicular thereto, the flow modifying elements being so dimensioned and orientated and the sets being so positioned relatively to each other such that the velocity profiles established by each such set only persist over a distance which is small compared to the flow direction dimension of the channel and to the principal transverse dimension of the channel and such that resin entering the first set at a particular position in the cross-section of the channel exits from the last set at substantially the same position on the cross-section.

2. Apparatus as claimed in claim 1, wherein the flow modifying elements are elongate and are disposed at an angle relative to the principal flow direction along the channel, said elements being arranged in a plurality of transverse rows along the channel, and each of such rows being comprised of a plurality of the flow modifying elements.

3. Apparatus as claimed in claim 2, wherein within each row the flow modifying elements are substantially parallel to each other.

4. Apparatus as claimed in claim 3, wherein the transverse rows are provided alternately on opposite faces of the channel, and the flow modifying elements of one row are angled in the opposite direction to those of the adjacent row on the opposite face of the channel.

5. Apparatus as claimed in claim 4, wherein the flow modifying elements of the alternate rows are at equal opposite angles to the principal flow direction along the channel.

6. Apparatus as claimed in claim 3, wherein each transverse row of flow modifying elements on one face of the channel is provided opposite a further transverse row of flow modifying elements on the other face of the channel, the flow modifying elements of such opposed rows are angled in opposite directions to the principal flow direction, and a plurality of such pairs of opposed rows is provided along the channel.

7. Apparatus as claimed in claim 6, wherein the flow modifying elements of the opposed rows are at equal opposite angles to the principal flow direction along the channel.

8. Apparatus as claimed in claim 2, wherein within any one transverse row the flow modifying elements are arranged alternately at opposite angles to the principal flow direction, and a plurality of such rows are provided along the channel.

9. Apparatus as claimed in claim 8, wherein the alternate flow modifying elements in a transverse row are at equal opposite angles to the principal flow direction along the channel.

10. Apparatus as claimed in claim 8, wherein the point of closest approach of adjacent flow modifying elements in a transverse flow is a minimum of one third of a vane length.

11. Apparatus as claimed in claim 2 wherein the flow modifying elements are at an angle of $\pm 40°-50°$ relative to the principal flow direction along the channel.

12. Apparatus as claimed in claim 11, wherein the flow modifying elements are at an angle of about $\pm 45°$ relative to the principal flow direction along the channel.

13. Apparatus as claimed in claim 2 wherein the flow modifying elements are vanes projecting into the channel.

14. Apparatus as claimed in claim 13, wherein the vanes have a height of one third to one half the depth of the channel.

15. Apparatus as claimed in claim 13, wherein the width of a vane is a small fraction of its length.

16. Apparatus as claimed in claim 13 wherein the vanes have smoothly contoured surfaces to prevent separation of fluid flow.

17. Apparatus as claimed in claim 16, wherein the upstream face of the vane is of shallower contour than the downstream face.

18. Apparatus as claimed in claim 1 wherein the channel is shaped for the production of an article of solid section.

19. Apparatus as claimed in claim 1 wherein the channel is shaped for the production of an article of hollow section.

20. Extrusion apparatus comprising polymer resin processing apparatus as claimed in claim 1 and an extrusion die located downstream of said processing apparatus in the principal flow direction along the channel.

21. Extrusion apparatus as claimed in claim 20, having heating means between the downstream flow modifying element and the extrusion die for establishing a viscosity gradient in the polymer so as differentially to increase or reduce fibres at least one of the surfaces of the product.

22. Moulding apparatus comprising a polymer resin processing apparatus as claimed in claim 1 and a mould cavity located downstream of said processing apparatus in the principal flow direction along the channel.

23. A process for the preparation of a fibre filled liquid polymer composition comprising passing liquid resin containing discrete fibers along a flow channel adapted to impose on the resin a regulated succession of velocity profiles on the principal flow direction and on the other two directions perpendicular thereto, the individual profiles persisting over distances which are small compared to the principal flow direction dimension of the channel and to the principal transverse dimension of the channel, the profiles being such that resin at a particular position on the cross-section of the channel where the first of the sequence velocity profiles is imposed is at substantially the same position on the cross-section of the channel immediately after the last of the sequence of velocity profiles has been superimposed and such that the mutually perpendicular velocity profiles superimpose on each other so as to result in at least rotation or sliding of the fibers relative to the resin such that as the resin passes along the channel the fibers build up a network structure.

24. A process as claimed in claim 23, wherein the fibres are monofilaments.

25. A process as claimed in claim 23 wherein the fibres have a length of 5 to 15 mm.

26. A process as claimed in claim 23 wherein the fibres are glass fibres, organic fibres, ceramic fibres or metal fibres.

27. A process as claimed in claim 23 wherein the resin is a thermoplastic.

28. A method of extrusion comprising preparing a fibre filled resin composition using the process of claim 23 and extruding the composition through a die.

29. A method of moulding comprising preparing a fibre filled resin composition using the process of claim 23 and introducing the composition into a mould cavity.

30. A fiber filled polymer product comprising a polymer matrix containing a network of discrete fibers in which the orientation of the fibers is substantially independent of the axis along which resin has flowed during manufacture of the product, the network being comprised of major strands of a plurality of filaments and an in-fill of mainly single filaments in spaces bounded by the major strands wherein the average number of near touches which each fiber makes with adjacent fibers is equal to N where N is in the range $0.5 \times c$ (l/d) to $2.5 \times c$ (l/d) with a minimum value of 8, where c is the volume fraction of the fibers in the product and is in the range above 0.005 to 0.1 for a thermoplastic and in the range above 0.005 to 0.4 for a thermosetting resin, and l/d is the aspect ratio of the fibers.

31. A product as claimed in claim 30, wherein c is greater than 0.005 to 0.08.

32. A product as claimed in claim 31, wherein c is greater than 0.005 to 0.05.

33. A product as claimed in claim 30 wherein the polymer is a thermoplastic.

34. A product as claimed in claim 30 wherein the fibres are monofilaments.

35. A product as claimed in claim 30 wherein the fibres have a length of 3 to 15 mm.

36. A product as claimed in claim 30 in which no specific fibre matrix coupling agents are used.

37. A product as claimed in claim 30 which is a hollow extrudate.

38. A product as claimed in claim 30 wherein the fibres are electrically conducting and the network structure screens the passage of electromagnetic waves through the material.

39. A product as claimed in claim 30 wherein the fibres have at least 10 times the conductivity of the polymer, and the network structure increases the thermal conductivity of the product by at least one third $\times c \times$ thermal conductivity of the fibres.

40. A product as claimed in claim 30 wherein N is in the range $0.8 \times c$ (l/d) to $2.5 \times c$ (l/d).

* * * * *